CONVERGENCE DEVICE FOR COLOR TELEVISION RECEIVER

Filed Feb. 11, 1969 6 Sheets-Sheet 1

May 12, 1970 SUSUMU EGAWA ET AL 3,512,035

CONVERGENCE DEVICE FOR COLOR TELEVISION RECEIVER

Filed Feb. 11, 1969 6 Sheets-Sheet 5

CONVERGENCE DEVICE FOR COLOR TELEVISION RECEIVER

Filed Feb. 11, 1969

United States Patent Office 3,512,035

Patented May 12, 1970

3,512,035

CONVERGENCE DEVICE FOR COLOR TELEVISION RECEIVER

Susumu Egawa and Katsuhiko Shiomi, Osaka, Akira Aoki, Hironori Hisamoto, and Muneo Nishimura, Hirakata-shi, and Kanji Machida, Moriguchi-shi, Japan, assignors to Matsushita Electric Industrial Co., Ltd., Osaka, Japan, a corporation of Japan Filed Feb. 11, 1969, Ser. No. 798,427

Claims priority, application Japan, Feb. 27, 1968, 43/13,245, 43/13,246, 43/13,247, 43/15,666, 43/15,667, 43/15,668, 43/15,669, 43/15,670, 43/15,671, 43/15,672, 43/15,673, 43/15,674, 43/15,675, 43/15,696, 43/15,697

Int. Cl. H01j *1/02, 7/24, 29/70*

U.S. Cl. 315—13 18 Claims

ABSTRACT OF THE DISCLOSURE

A two-pole type convergence device comprising a rectangular convergence yoke provided with an attaching portion adapted for engagement with the neck portion of a cathode ray tube, and two sets of dynamic convergence units and static convergence units constituted by static magnets serving also as lateral magnets, wherein "red" and "green" electron beams are simultaneously driven by one set of dynamic and static convergence units, and "blue" electron beam is driven by the other set of dynamic and static convergence units.

This invention relates to a convergence device for a color television receiver, and more particularly it pertains to the arrangement of a miniaturized two-pole type convergence device.

The conventional convergence device for a color television receiver comprises three pole pieces incorporated in the neck portion of a cathode ray tube, three dynamic convergence cores and static convergence magnets provided outside the neck portion in opposing relationship to the pole pieces, and a "blue lateral" magnet provided outside the neck portion. With such conventional arrangement, if the three static convergence magnets, three dynamic convergence cores and blue lateral magnet are mounted on a common board, then it is impossible to provide convergence adjusting members such as thumbscrews and so forth on that common board since a large space is occupied by the static convergence magnets, dynamic convergence cores and blue lateral magnets. Use of a board having a greater area makes it possible to provide such adjustment members thereon, but in practice this cannot be realized due to the limited space of the color television receiver per se. In the prior art, therefore, it is the usual practice that the convergence board is attached to the back plate of the reeciver.

It is a primary object of the present invention to provide a convergence device free from the foregoing drawbacks and capable of quickly effecting convergence adjustment in a color television receiver.

Another object of the present invention is to provide a convergence device arrangement for a color television receiver, which is easily constructed on the basis of the principle of the two-pole convergence system and yet at low cost.

Other objects, features and advantages of the present invention will become apparent from the following description taken in conjunction with the accompanying drawings, in which.

Figure 1:
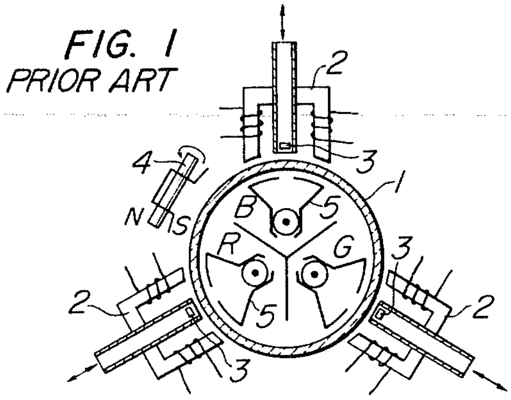
FIG. 1 PRIOR ART
FIG. 1 is a sectional view through a three gun cathode ray tube showing the principle of a prior art convergence device.

Referring to FIG. 1, the conventional convergence device comprises three pole pieces 5 accommodated in the neck portion 1 of the envelope, three dynamic convergence cores 2 provided externally of the envelope in opposing relationship to the pole pieces 5 respectively, static convergence magnets 3, and a "blue lateral" magnet 4.

With such an arrangement, however, providing the magnets 3, cores 2 and "blue lateral" magnet 4 on a common board makes it impossible to provide a convergence adjusting thumbscrew or like adjustment means thereon, since too great an area of the board is occupied by the magnets 3, cores 2 and "blue lateral" magnet 4. In practice, such convergence board is mounted on the rear plate of the receiver.

Recently, a two-pole type convergence device has been proposed, the operation of which will now be described becanse such device is not commonly well known. The principle of static convergence will be mentioned with reference to FIG. 2, which is a diagrammatic sectional view showing the neck portion of the picture tube viewed toward the electron guns. In the neck portion 6 there is a Y-shaped shield plate 7. Pole pieces 8, 8' and 8'', each of which is formed by a pair of bent metal plates disposed in opposing relationship to each other, are provided in the compartments defined by the shield plate 7 and inner wall of the neck portion 6. Electron guns 9, 9' and 9'' are mounted at the end of the neck portion 6 so that electron beams are made to pass between the two electrodes of the respective pole pieces 8, 8' and 8''.

The foregoing construction is the same as that of the conventional cathode ray tube. The two-pole convergence device additionally includes a pair of permanent magnets such as a first plate-like permanent magnet 10 provided externally of the neck portion 6 in opposing relationship to the pole piece 8 and a second permanent magnet 11 provided symmetrically with respect to the permanent magnet 10 about the center of the neck portion 6.

Figure 2:
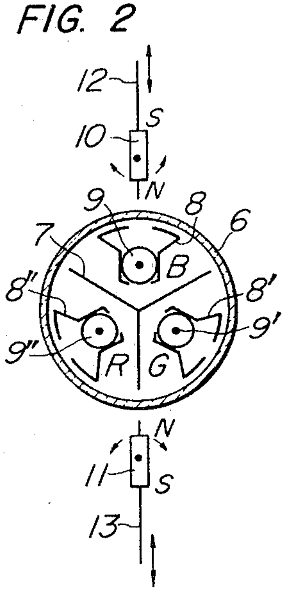
FIG. 2 is a sectional view through a three gun cathode ray tube showing the principle of a two-pole static convergence device.

The permanent magnets 10 and 11 are arranged in a plane perpendicular to the axis of the neck portion 6 and mounted on the free ends of support rods 12 and 13 so as to be rotatable in the plane. The support rods 12 and 13 are adapted to be displaced in directions perpendicular to the axis of the neck portion 6 as indicated by the double headed arrows so that the permanent magnets 10 and 11 may be moved toward or away from the neck portion 6. In FIG. 2, the pole piece 8 is related to the "blue" electron gun 9, the pole piece 8' to the "green" electron gun 9', and the pole piece 8'' to the "red" electron gun 9''.

Figure 3:
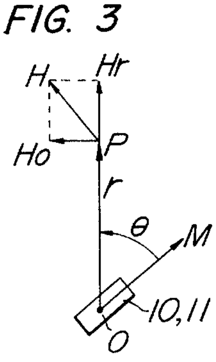
FIGS. 3 and 4 are diagrammatic views useful for explaining the device shown in FIG. 2.

The basic function of the permanent magnets 10 and 11 is described with reference to FIG. 3. A vector H at a point $p$ which is spaced apart from the center of the permanent magnet 10 or 11 by a distance $r$ will be sought. Assume that the magnetic moment of the permanent magnet 10 or 11 is M, then the magnetic potential U at that point is given by $$U=\frac{1}{4\pi\mu_0}\cdot\frac{MH}{r^3}=\frac{1}{4\pi\mu_0}\cdot\frac{M\cos\theta}{r^2} \quad (1)$$

where $\theta$ is the angle between the direction of the magnetic moment M and the direction $r$, and $\mu_0$ is permeability. From this, the component $H_r$ in the direction of $r$ and the component $H_\theta$ in the direction of $\theta$ of the magnetic field intensity are obtained as follows:

$$H_r=-\frac{\alpha U}{\alpha r}\frac{1}{4\pi\mu_0}\cdot\frac{2M\cos\theta}{r_2} \quad (2)$$

$$H_\theta=-\frac{\alpha U}{r\alpha\theta}=\frac{1}{4\pi\mu_0}\cdot\frac{M\sin\theta}{r^3} \quad (3)$$

with $\theta$ eliminated from Equations 2 and 3, the locus of the vector H as the permanent magnet 10 or 11 is rotated, and is represented by $$\frac{H_r^2}{(2K)^2}+\frac{H_\theta^2}{K^2}=1 \quad (4)$$

where $$K=\frac{1}{4\pi\mu_0}\cdot\frac{M}{r^3}$$

Figure 4:
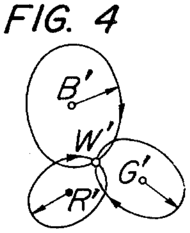

Equation 4 describes an ellipse of which the longer diameter is twice as long as the shorter diameter. Thus, positioning a beam at the point $p$ results in an elliptical motion. By applying such motion to FIG. 3, there is produced a convergence effect as shown in FIG. 4. Thus, the electron beam spots, which are located at positions R', G' and B' when they are not subjected to convergence correction, converge so that the beam spots R' and G' are initially brought into register with each other at a point W'. This is achieved by rotating and displacing the permanent magnet 11, in view of the fact that the closer to the neck portion the permanent magnet 11 is located, the higher the magnetic field becomes. Subsequently, by rotating and displacing the permanent magnet 10, the beam spot B' is brought into register with the point W'. In this way, the functions which have conventionally been provided by both the "red" static convergence magnet and "green" static convergence magnet can be achieved by the single permanent magnet 11, and the functions which have conventionally been provided by both the "blue" static convergence magnet and "blue lateral" magnet can be achieved by the permanent magnet 10. The foregoing calculation was performed on the assumption that a simple magnetic dipole is positioned in a space. Actually, however, the pole pieces 8, 8' and 8'' have considerably great effect on the operation of the foregoing arrangement.

Description will now be made of dynamic convergence. In view of the fact that there is considerable similarity in the necessary amount of dynamic convergence correction and waveform existing between "red" and "blue," a single core is provided common to the electron guns for these two primary colors so that the "red" and "blue" beams are driven by the legs of the core to thereby produce an effect similar to that of the prior art construction.

Figure 5:
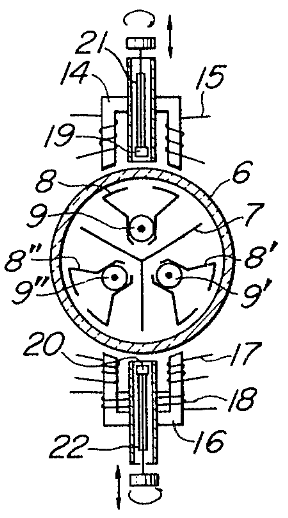
FIG. 5 is a sectional view through a three gun cathode ray tube illustrating the principle of a two-pole dynamic convergence device.

As shown in FIG. 5, a U-shaped core 14 is mounted externally of the neck portion 6 of the picture tube, in such a manner that the two legs thereof are disposed in opposing relationship to the two electrode plates constituting the pole piece 8 related to the "blue" electron gun 9. Coils 15 are wound on the legs of the core 14. Further, a U-shaped core 16 is mounted with the two legs thereof disposed in opposing relationship to the adjacent electrode plates of the pole pieces 8' and 8'' related to the "green" electron gun 9' and "red" electron gun 9'' respectively. Main coils 17 and differential coil 18 are wound on the legs of the core 16.

The main coils 17 are wound on the respective legs of the core 16 and connected in series with each other, and the differential coil 18 is wound in such a manner as to surround the two legs. Referring to FIG. 5, this embodiment further includes static convergence magnets 19 and 20 and iron pieces 21 and 22 for producing a radial magnetic field and so forth. These elements are similar to those used in the two-pole static convergence device shown in FIG. 2, and therefore further description thereof will be omitted.

Figure 6:
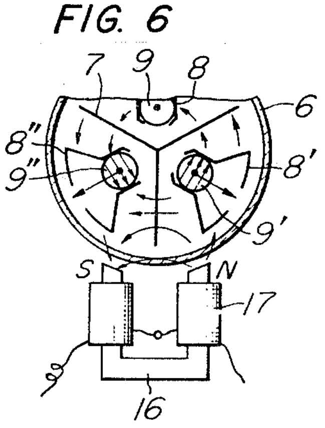
FIGS. 6 and 7 are partial sectional views useful for explaining the device shown in FIG. 5.
Figure 7:
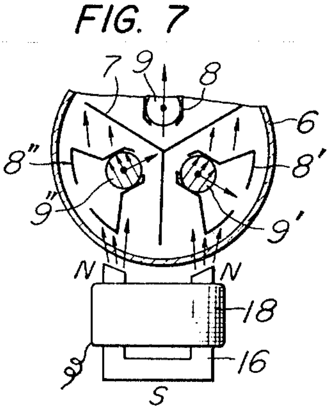

The operation of this device will be described below. The coils 15 wound on the respective legs of the core 14 and connected in series with each other are supplied with a parabolic current, whereby correction is effected with respect to the upper and lower portions of the screen. Since the "red" and "green" electron guns are juxtaposed in a horizontal plane, the "red" and "green" beams are spaced apart from each other to the left and right prior to dynamic convergence. By flowing a parabolic current through the main coils 17, as shown in FIG. 6, these beams can be brought into register with each other. Longitudinal deviation remaining after such correction is corrected by flowing a parabolic current through the differential coil 18 to magnetize the end portions of the legs of the core 16 in the same polarity so that the "red" beam is corrected in the negative direction and the "green" beam in the positive direction. From the foregoing description, the principle of the two-pole convergence device is clear.

Figure 8:
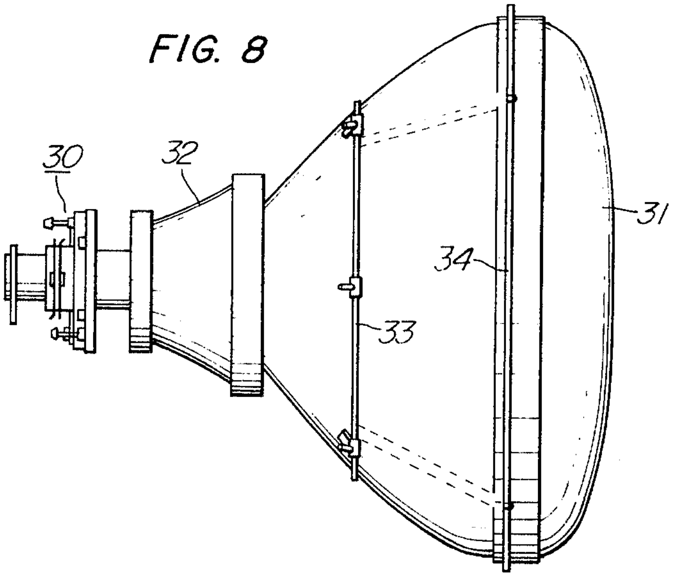
FIG. 8 is a side view showing a cathode ray tube provided with the convergence device embodying the present invention.

Description will now be made of another embodiment of the present invention with reference to FIGS. 8 through 18. Referring first to FIG. 8, the convergence device 30 embodying the present invention is shown mounted on the neck portion of a cathode ray tube 31. The reference numerals 32 to 34 indicate a deflection coil, an edge purifying magnet, and an automatic demagnetizing coil, respectively.

Figure 9:
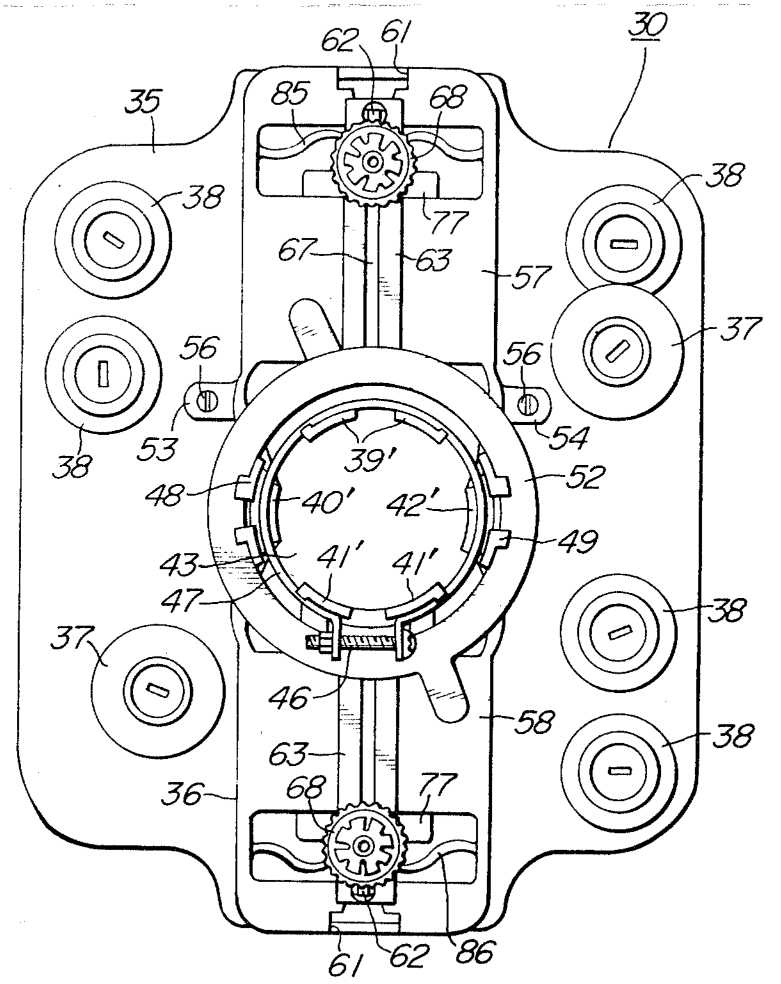
FIG. 9 is a top plan view of the present convergence device.
Figure 10:
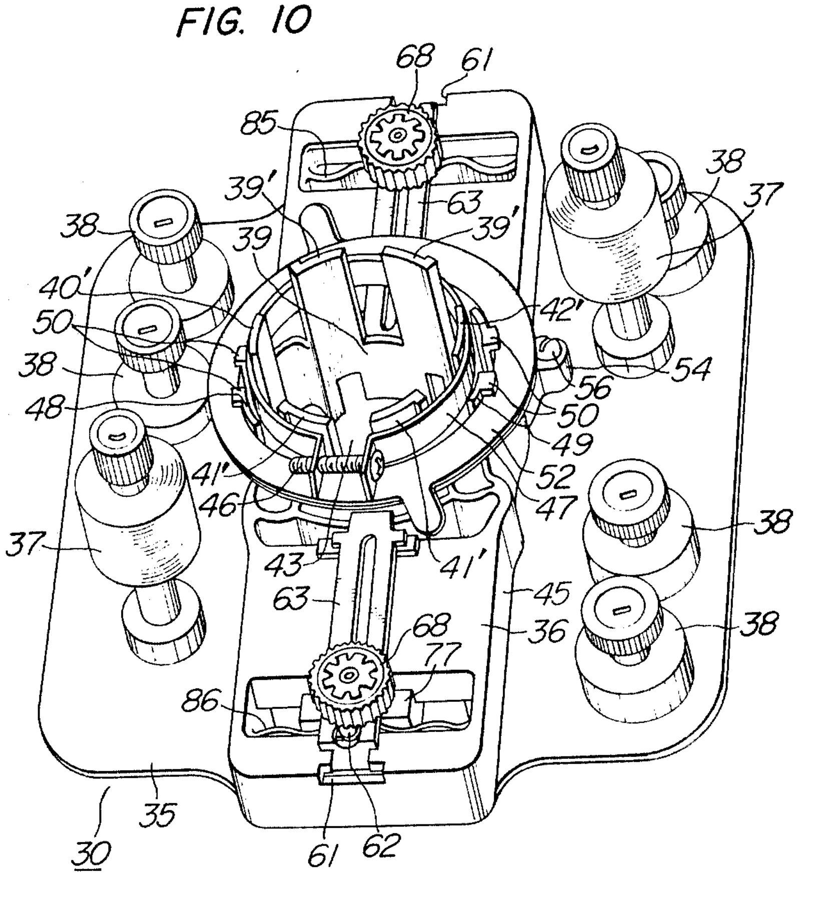
FIG. 10 is a perspective view thereof.
Figure 11:
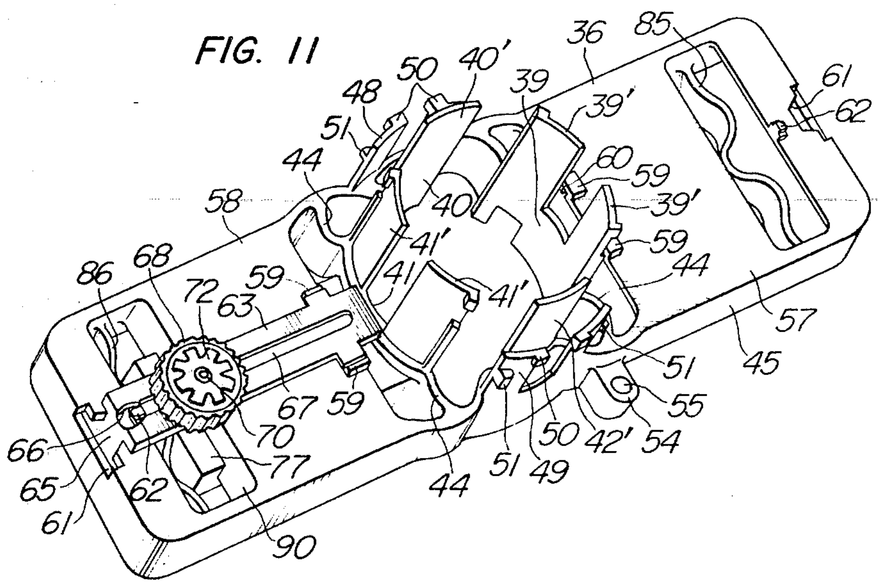
FIG. 11 is a perspective view showing the main portion of the convergence yoke portion included in the present device.

The convergence device 30 is fitted on the neck portion of the cathode ray tube 31 to externally impart a D.C. magnetic field to the electron guns, whereby the "blue," "red" and "green" electron beams are made to accurately converge at the center and peripheral portions of the screen. Thus, the direction of each electron beam can be corrected, as described above with respect to the principle of operation. The convergence device 30 adapted to produce such effect is constructed as shown in FIGS. 9 and 10. The convergence device 30 is largely divided into two parts, that is, a convergence board 35 having necessary components mounted thereon and a convergence yoke 36.

The components on the convergence board 35 include the aforementioned convergence yoke 36, high-frequency coils for adjusting the waveform of a current flowing through a horizontal convergence coil for the dynamic convergence, which will be described later, and variable resistors 38 for adjusting the waveform of a current flowing through a vertical convergence coil. The high-frequency coils 37 and variable resistors 38 are positioned outside the range of rotation of a purity magnet 52, which will be described later, so that the adjustment of these components can be facilitated. In order to further facilitate such adjustment, the adjusting portions of the high-frequency coils 37 and variable resistors 38 may be arranged in such a manner as to project beyond the purity magnet 52, if desired.

The details of the convergence yoke 36 will be described below.

The convergence yoke 36 is formed in rectangular shape by a thermoplastic synthetic resin material having some elasticity, such as polyacetal resin. Formed in the center portion of the yoke 36 is an attaching portion 43 to be disposed in engagement with the neck portion of the cathode ray tube 31, said attaching portion 43 being constituted by four arcuate holder pieces 39, 40, 41 and 42, and projections 39′, 40′, 41′ and 42′, respectively, extending from the holder pieces. The holder pieces 39, 41 and 40, 42 are disposed in opposing relationship to each other so as to form a cylinder. The spacing between the holder pieces 39 and 41 is made somewhat smaller than that between the holder pieces 40 and 42 which are formed on the outer frame 45 side of the convergence yoke 36, and they are jointed at the opposite edges to the thick outer frame 45 with no elasticity through bends 44 which are elastically expandable and contractible. Thus, by inserting the neck portion of the cathode ray tube 31 through the attaching portion 43, the holder pieces 39 and 41 are first pressed against the neck portion, and further insertion results in the holder pieces 39 and 41 being pushed out and the remaining holder pieces 40 and 42 being also pressed against the neck portion. This ensures the positive attachment of the entire convergence device 30 to the neck portion because of the fact that the holder pieces 39 and 41 are more strongly pressed against the neck portion. A ring-like locking member 47 is fitted on the top portions of the holder pieces 39′, 40′, 41′ and 42′, and it is provided at the opposite ends thereof with a screw 46 for adjusting the locking state. Thus, the attachment of the convergence device 30 to the neck portion is further insured.

Outside the arcuate holder pieces 40 and 42 are arcuate mounting pieces 48 and 49 contiguous with the outer frame 45, the mounting pieces 48 and 49 having a larger radius than that of the holder pieces 40 and 42 and the center of which is located at a different position from those of the holder pieces 40 and 42. Two lateral projections 50 and 51 are formed at the inner edges of the upper portions of the mounting pieces 48 and 49, and a ring-like purity magnet 52 is mounted between the projections 50, 50 and 51, 51. The purity magnet has a smaller diameter than that of the mounting pieces 48 and 49 so that it is supported at four points by the mounting pieces 48 and 49. Thus, the magnet is positioned so that it is not offset with respect to the neck portion of the cathode ray tube 31.

Further, U-shaped mounting legs 53 and 54 extend sidewise from the outer frame 45 in the end portion of the attaching portion 43 of the convergence yoke 36, and elongated apertures are formed in the center portions of the mounting legs 53 and 54. Bolts 56 are inserted in the elongated apertures 55 of the mounting legs 53 and 54, extending through the convergence board 35, whereby the convergence yoke 36 is fixed to the board 35 by means of nuts. On the opposite sides of the center of the convergence yoke 36 are flat portions 57 and 58 which constitute a ceiling surface of the outer frame 45. Projections 59 are formed on the attaching portion 43 side of the flat portions 57 and 58, and two recesses 60 are formed in the rear surface of each projection 59. In the center portion at the outer end of each of the flat portions 57 and 58 is formed a

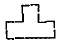 -shaped mounting hole 61, and slip-out preventing projections 62 are provided in the neighborhood of the mounting holes 61.

Figure 13:
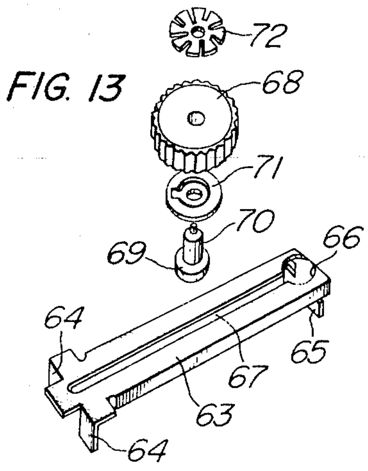
FIG. 13 is an exploded perspective view showing the static magnet portion.
Figure 14:
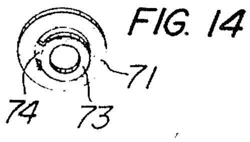
FIG. 14 is a perspective view showing a washer used in the static magnet portion.

Slide plates, such as shown in FIG. 13 which constitute static convergence means, are interposed between the projections 59 and the mounting holes 61. A pair of flanges 64 on one end of the slide plates 63 are bent into the positioning recesses 60, and T-shaped engaging pieces 65 on the other end thereof are disposed in engagement with the mounting holes 61, thereby fixing the slide plates 63. The reason why the slide plates 63 are positioned as described above is to mount the static magnets symmetrically with respect to the pole pieces for the purpose of making the action of the magnetic force even at the respective pole pieces. Larger diameter insertion holes 66 are formed in the slide plates 63 on the insertion hole 66 sides, and there are formed elongated guide holes 67 contiguous with the insertion holes 66 and having a smaller width than the latter. Disk-like static magnets 68 are mounted in the guide holes 67. Each of the static magnets comprises a mounting pin 70 with a disk portion 69 having a somewhat smaller diameter than said insertion hole 66, a rotation sliding motion separating washer 71 interposed between the disk portion 69 and the static magnet 68, and a chrysanthemum-like or Belleville spring 72 placed on the static magnet 68. The upper end of the mounting pin 70 is flared to maintain those components in the assembled state. The disk portion 69 is pressed against the static magnet 68 by means of the chrysanthemum-like spring 72. The rotation sliding motion separating washer 71 is provided with a stepped-up plate 73 having substantially the same size as the disk portion 69, and the plate 73 is jointed to the washer 71 through a connecting portion 74 which is fitted in the guide hole 67. Since the connecting portion 74 of the rotation sliding motion separating washer 71 is inserted into the guide hole 67 of the slide plate 63, it is possible to completely prevent the static magnets 68 from moving on the slide plates 63 or rotating when they slide along the guide holes 67, even if stress is imparted to the slide plate 63 held between the disk portion 69 and the bottom surface of the static magnet 68, when the static magnet 68 is rotated. Thus, desired static convergence adjustment can be achieved. Further, located at the connecting portion between the guide hole 67 and the insertion hole 66 of the slide plate 63 is the slip-out preventing projection 62, whereby the static magnet 68 is prevented from slipping out of the guide hole 67 while the slide plate 63 is attached to the convergence yoke 36.

Two such static convergence unit means, one for "blue" and the other for "green" and "red" are provided about the attaching portion 43.

The static convergence device comprising the static magnets 68 is disposed in substantially the same plane as a plane containing the rear end surface of the pole pieces incorporated in the cathode ray tube 31, and the static magnets 68 are adjustably slid or rotated in this plane. With such an arrangement, complete balance can be secured between necessary lateral sensitivity and necessary radial sensitivity, thus resulting in improved overall sensitivity.

In case the static magnet 68 is disposed in overlapping relationship to the pole pieces or in case the magnet is positioned in a plane perpendicular to the tube axis and intersecting the pole pieces, the action of the magnet is greatly affected by the pole pieces, so that the sensitivity in the radial direction is decreased while the sensitivity in the lateral direction is increased. Thus, unbalance in sensitivity occurs between the radial and the lateral direction, so that the overall sensitivity becomes poor.

Figure 15:
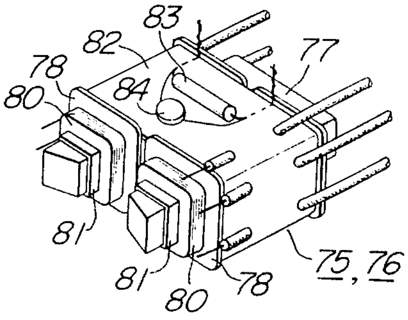
FIG. 15 is a perspective view of the dynamic convergence coil means constituting the present device.
Figures 16, 17, 18:
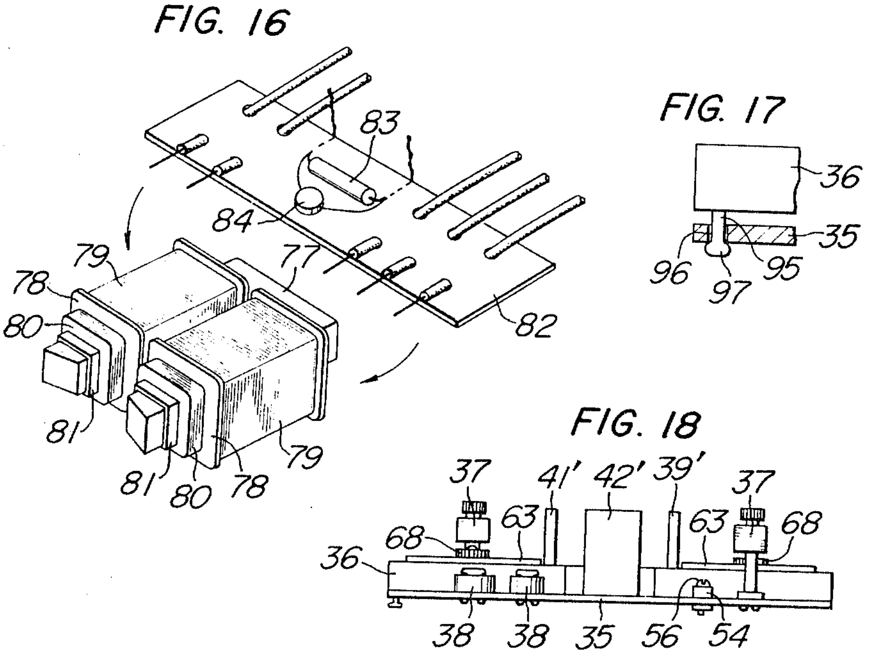
FIG. 16 is a perspective view showing the coil means partially disassembled.
FIG. 17 is a side view showing the convergency device according to a second embodiment of the present invention.
FIG. 18 is a side view showing the main portion thereof.

In the lower portion of the static coverage unit means, or on the bottom surfaces of the flat portions 57 and 58 are dynamic convergence units 75 and 76 respectively, one of which is used in common for "red" and "green" beams because of the similarity in the necessary amount of correction and waveform occurring between these two beams and the other one of which is used for the "blue" beam, whereby sufficient convergence is achieved. The dynamic convergence units 75 and 76 are constructed as shown in FIGS. 15 and 16.

On the two legs of a U-shaped ferrite core 77 are vertical convergence coils 79 wound on bobbins 78. Completely independent horizontal convergence coils 80 are mounted in front of the vertical convergence coils 79 and separated from the latter from insulators 81. The vertical convergence coils 79 are entirely covered with a lead terminal board 82 formed by a sheath sheet which is impregnated with wax. Mounted on the lead terminal board 82 are a resistor 83 and thermistor 84 for correcting the characteristics of the vertical convergence coils 79. The constants of the thermistor 84 are changed with variations in temperature of the vertical convergence coils 79 so that variations in resistance of the vertical convergence coils 79 are corrected. The use of the lead terminal board 82 impregnated with wax eliminates the step of impregnating the vertical convergence coils with wax and yet results in perfect insulation of that portion.

Such dynamic convergence units 75 and 76 are provided on the bottom of the flat portions 57 and 58 of the convergence yoke 36, as described above. The mounting portion of the convergence yoke 36 is so designed that the dynamic convergence units 75 and 76 are elastically held between the aforementioned arcuate holder pieces 39 and 41 and wave-shaped holding frames 85 and 86 formed in the bottom surface at the opposite ends of the convergence yoke 36. The arcuate holder pieces 39 and 41 are formed with guide grooves 87 and 88 into which are fitted the opposite end portions of the ferrite core 77. Thus, the dynamic convergence units 75 and 76 are elastically held symmetrically with respect to the pole pieces by means of the guide grooves 87 and 88 and the projecting portions of the corrugated holding frames 85 and 86. Unless these dynamic convergence units 75 and 76, especially the one which is used in common for the "red" and "green" beams, are positioned symmetrically with respect to the "red" and "green" electron guns, magnetic force related to either one of the electron guns becomes greater than that related to the other electron gun so that unbalance occurs therebetween, which leads to unsatisfactory convergence and makes the convergence device worthless. Of course, this can also be said of the dynamic convergence with respect to the "blue" beam.

Since the dynamic convergence units 75 and 76 are supported by the wave-shaped holding frames 85 and 86 as well as by the arcuate holder pieces 39 and 41 pressed against the neck portion of the cathode ray tube 31, the holding frames 85 and 86 are somewhat elastic so as to be able to sufficiently cope with the elastic expansion and contraction of the arcuate holder pieces 39 and 41 which occur when the units are attached onto the neck portion. The reason why elasticity is provided in the arcuate holding pieces 39 and 41 and wave-shaped holding frames 85 and 86, which serve as two supports for the units, is to place the fore ends of the ferrite core 77 close to the neck portion of the cathode ray tube 31 and hence the electron guns, thereby producing greater magnetic forces to impart greater driving forces to the beams.

In the neighborhood of the wave-like holding frames 85 and 86, the other end portions of the ferrite core 77 are maintained at the same level as the guide grooves 87 and 88 into which the fore ends of the ferrite core 77 are fitted, and there are provided restraining plates 89 and 90 in opposite end portions of the respective cores 77. The ferrite cores 77 are maintained completely horizontal by means of the restraining plates 89 and 90 and guide grooves 87 and 88, so that the arcuate surfaces formed in the fore ends of the cores are arranged complementarily with respect to the neck portion of the cathode ray tube 31. With such arrangement, it is also possible to impart greater driving forces to the electron beams.

Figure 12:
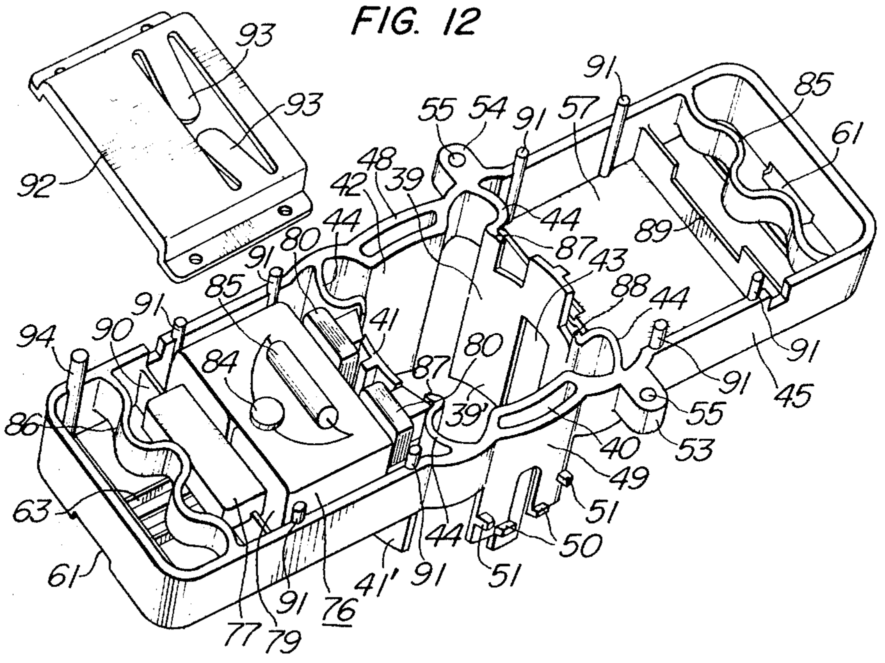
FIG. 12 is a rear perspective view showing the main portion in a disassembled state.

Four projections 91 are integrally provided in that bottom surface of the outer frame 45 of the convergence yoke 36 on which the dynamic convergence units 75 and 76 are mounted, and covers 92 formed of thermoplastic resin, such as shown in FIG. 12, are attached thereto. The covers 92 are fixed to the outside frame 45 by welding the fore ends of the projections 91 to the covers. Each of the covers 92 is provided with a pair of inwardly bent pressing pieces 93 of which the elasticity is utilized to maintain the dynamic convergence units 75 and 76 in place and prevent the latter from being displaced from their horizontal positions due to vibration and/or shock.

On the bottom surface of the outside frame 45 of the convergence yoke 36 at any desired position is integrally provided a fixing projection 94 which extends through the convergence board 35 and the end portion of which is welded to the board. Thus, the convergence yoke is fixed to the convergence board 35 at three points by means of the projection 94 and the mounting legs 53 and 54. Such three-point fixing results in the convergence yoke 36 and board 35 being more strongly fixed to each other.

The fixing projection 94 may be provided at any desired position as described above, but the fixing strength can be further increased by providing it at the remotest position from the mounting legs 53 and 54.

Although the convergence yoke 36 and convergence board may be completely fixed to each as described above, it is also possible that they may be somewhat elastically combined with each other as shown in FIGS. 17 and 18. By doing so, it is possible to accommodate distortion occurring in the convergence yoke 36 when the latter is attached onto the neck portion of the cathode ray tube 31. A projection 95 is provided at one end portion of the bottom surface of the outside frame 45 of the convergence yoke 36, and a through-aperture 96 is formed in the convergence board 35 in opposing relationship to the projection 95. Slip-out preventing means 97 is constituted by welding the lead portion of the projection 95 after the latter has been inserted through the aperture 96. The projection 95 has a greater length than the width of the convergence board 35, so that the latter is movable in the range corresponding to the length of the projection 95.

With the foregoing arrangement, the convergence device can easily be positioned in the axial and radial directions when it is mounted on the cathode ray tube. Namely, by locating the purity magnet portion relative to the neck portion, the dynamic convergence unit and static convergence unit portions can be simultaneously located relative to the neck portion of the cathode ray tube. Advantageously, therefore, the adjustment of these components can be quickly carried out so that the assembly of a color television receiver can be facilitated, thus increasing the producibility. Since the purity magnet, static convergence units and dynamic convergence units are maintained in predetermined relationship to each other, the present convergence device, when applied to a color television receiver, represents uniform characteristics, and the operation thereof, such as an adjustment, can be further facilitated.

Furthermore, since the convergence yoke can be molded of a resin, the present device can be manufactured with ease and at low cost, and yet it can be given improved mechanical strength.

Since the present device is of the two-pole type, the number of parts thereof is greatly reduced, and the convergence yoke and convergence board can be made integral with each other so that electrical connection between the respective components can easily be effected and the possibility that the components mounted on the yoke and board may be badly affected by external vibrations and so forth can be avoided.

The device can be attached to the neck portion positively, firmly and yet easily, since that portion thereof which is attached to the neck portion of the cathode ray tube is so designed that it is elastically attached thereto. Further, the arcuate holder pieces of the attaching portion are pressed against the neck portion of the cathode ray tube, so that the spacing between the dynamic convergence cores and the neck portion or the electron guns incorporated in the neck portion are reduced and maintained constant. Thus, increased magnetic force is caused to act on the electron guns, resulting in enhanced sensitivity.

Since the static convergence units are attached to the convergence yoke by means of a slide plate, the static magnets can be arranged completely symmetrically with respect to the "blue," "red" and "green" electron guns so that the magnetic forces acting on the electron guns become uniform, thus resulting in improved static convergence characteristics. Furthermore, since the static magnets can be manipulated in the same plane, symmetry of the magnetic field can be secured so that balanced characteristics can be attained. Still furthermore, loss of the magnetic field can be minimized because of the fact that the static magnets are arranged at regular intervals in the neighborhood of the dynamic convergence units. Thus, the magnetic field intensity can be maintained constant so that further improvement in the characteristics can be achieved.

Since the static magnets are arranged for rotation and sliding motion in a plane which is substantially parallel to the rear end surfaces of the pole pieces, perfect balance can be secured between the necessary lateral sensitivity and the necessary radial sensitivity so that the overall sensitivity can be enhanced. Thus, a picture of high quality can be produced. In the static convergence units, the static magnets can be stably attached to the slide plate since they are assembled by the use of springs, and by employing washers for separating the rotation and sliding motion of these static magnets, the adjustment thereof can be further positively effected.

The mounting portion of the purity magnet is also elastically supported in uniformly spaced relationship to the neck portion of the cathode ray tube so that a uniform magnetic field can be produced and the adjusting operation can be smoothly performed. Further, the purity magnet can be stably held parallelly with respect to the convengence yoke.

The dynamic convergence units are also elastically attached to the convergence yoke, so that the location thereof can be accurately achieved, thus resulting in accurate and stable magnetic action with respect to the pole pieces incorporated in the neck portion of the cathode ray tube.

The attachment of the dynamic convergence units can be further stabilized by enclosing the units within the covers provided with pressing pieces, and thus, coupled with the aforementioned arrangement, eliminates the possibility that the dynamic convergence units are adversely affected, destroyed or displaced by external stress or vibration. This greatly contributes to the production of an improved color television receiver which is capable of producing a stabilized color picture. By enclosing the vertical convergence coils of the dynamic convergence units with lead terminal plates having resistors and thermistors mounted thereon, the insulation of the vertical convergence coils can be improved, and the characteristics thereof can be made uniform. This also serves to improve the overall characteristics.

By providing the adjusting components mounted on the convergence board without involving the range of rotation of the purity magnet, the adjustment of those components or purity magnet per se can be greatly facilitated.

With the arrangement wherein the convergence board and convergence yoke are elastically combined with each other, the attachment of them to the neck portion of the cathode ray tube can be effected elastically with a margin so that distortion of the board and yoke can be accommodated.

What is claimed is:

1. A convergence device for a color television receiver having a color cathode ray tube having three electron guns and three pole pieces, said electron guns being equidistantly spaced from each other and from a point on the axial line of said color cathode ray tube, said pole pieces being equidistantly spaced from each other and from a point on said axial line, the device comprising a two-pole type convergence yoke having rigid rectangular frame portion means for attaching the convergence device to the neck portion of a cathode ray tube and mounting a pair of dynamic convergence units and a pair of static convergence units which static convergence units include static magnets serving also for a lateral magnet, said attaching means including mounting pieces to mount a purity magnet around the periphery of said attaching means, the arrangement being such that one dynamic convergence unit and one static convergence unit of said pairs of convergence units are cooperatively associated with one of said pole pieces while the remaining dynamic convergence unit and static convergence unit of said pairs of convergence units are cooperatively associated with the other two pole pieces.

2. A convergence device according to claim 1, wherein the rectangular two-pole type convergence yoke is integrally attached to a convergence board.

3. A convergence device according to claim 1, wherein said attaching means comprises four elastic arcuate holder pieces, two of said four arcuate holder pieces being mounted on the outer frame side of the convergence yoke in opposing relationship to each other spaced apart a distance equal to the maximum outer diameter of the neck portion of said tube, the spacing between the remaining two arcuate holder pieces being smaller than the maximum outer diameter of the neck portion, and said remaining two arcuate holder pieces being adapted to be elastically flexed outwardly.

4. A convergence device according to claim 1, further comprising slide plates having disk-like static magnets rotatably mounted thereon, said plates being mounted on the opposite sides of said attaching means symmetrically with respect to the electron guns incorporated in the neck portion of the cathode ray tube, said disk-like static magnets serving also as lateral magnets.

5. A convergence device according to claim 1, wherein each said dynamic convergence unit comprises vertical convergence coils and horizontal convergence coils wound on the legs of a U-shaped core, said dynamic convergence units being mounted on opposite sides of said attaching means symmetrically with respect to the electron guns incorporated in the neck portion of the cathode ray tube.

6. A convergence device according to claim 1, wherein said static convergence units constituted by static magnets serving also as lateral magnets are provided on the side opposite said attaching means, and said static magnets of said static convergence units being arranged for rotation and sliding motion in a plane which is substantially parallel to the rear end surface of the pole pieces incorporated in the neck portion of the cathode ray tube.

7. A convergence device according to claim 1, wherein arcuate mounting pieces having a diameter greater than the inner diameter of a ring-like purity magnet are provided on those outside portions of said attaching means which are contiguous with the outside frame of the convergence yoke, and said ring-like purity magnet being fitted between two projecting mounting pieces and provided at different levels.

8. A convergence device according to claim 2, further comprising at least two mounting legs provided on said rigid outside frame portion of the rectangular two-pole type convergence yoke in the neighborhood of said attaching means and adapted for engagement with said convergence board, at least one fixing projection provided on the outside frame at positions remote from said mounting legs, and said convergence yoke and said convergence board being completely fixed to each other by means of said mounting legs and said fixing projections.

9. A convergence device according to claim 2, further comprising at least two mounting legs provided on said rigid outside frame portion of the rectangular two-pole type convergence yoke in the neighborhood of said attaching means and adapted for engagement with said convergence board, a projection on that end portion of the outside frame of the convergence yoke remote from said mounting legs, a through-aperture formed in the convergence board at a position to receive said projection therein, slip-out preventing means provided on the fore end of said projection, and the end portion of the convergence yoke being somewhat elastically attached to the convergence board.

10. A convergence device according to claim 2, further comprising adjusting components mounted on said convergence board for adjusting the waveform and the like of currents flowing through said dynamic convergence units and the convergence yoke having the purity magnet provided thereon, said adjusting components being located out of the range of rotation of said purity magnet.

11. A convergence device according to claim 4, in which each said static magnet includes an assembly comprising a mounting pin having a disk portion provided at the lover end and a spring mounted on said pin and slide members provided on the opposite sides of that portion of said yoke which is attached to the neck portion of the cathode ray tube, each of said slide members having an insertion hole adapted for engagement with the disk portion of said mounting pin, an elongated guide hole contiguous with said insertion hole and having a smaller width than the diameter of said disk portion, and said static magnets being mounted on said slide members.

12. A convergence device according to claim 11, further comprising a washer having a downwardly offset cut plate formed in the center portion interposed between the static magnet and the disk portion of the mounting pin, the connection portion between the washer and the cut plate being fitted in the guide hole of the slide plate to thereby separate rotation and sliding motions of the static magnet.

13. A convergence device according to claim 5, further comprising substantially rigid flat portions contiguous with the outside frames of said convergence yoke being formed at the top of the dynamic convergence units, and said static convergence units being rotatably and slidably mounted on slide plates formed with an elongated guide hole and mounted between said flat portions and the opposite end portions of the outside frame.

14. A convergence device according to claim 5, further comprising elastically flexible arcuate holder pieces of said attaching means extending between the outside frames, elastically flexible holding frames provided between said outside frames and spaced apart from said attaching means by a distance substantially equal to the length of the dynamic convergence units each constituted by a core, vertical convergence coil and horizontal convergence coil, said dynamic convergence units being held between said holding frames and said arcuate holder pieces.

15. A convergence device according to claim 14, wherein said arcuate holding pieces are formed with a guide groove into which the fore end of the core of each dynamic convergence unit is fitted for determining the height and lateral position of the core, restraining plates on said convergence yoke with a recess into which the rear end portion of the core of said each dynamic convergence unit is fitted for determining the height and lateral position of the core.

16. A convergence device according to claim 14, wherein said dynamic convergence units are enclosed within a cover having an elastic pressing piece provided in the center portion and attached to the outside frame of said convergence yoke.

17. A convergence device according to claim 14, wherein the vertical convergence coil wound on the core of each dynamic convergence unit is encircled by a lead terminal plate consisting of a sheath sheet provided with a resistor and thermistor for correcting the characteristic of said vertical convergence coil.

18. A convergence device according to claim 1, wherein said convergence yoke is molded of resin.

References Cited

UNITED STATES PATENTS 3,305,807 2/1967 Ashley ------------ 313—77 X

RODNEY D. BENNETT, Jr., Primary Examiner

J. G. BAXTER, Assistant Examiner

U.S. Cl. X.R.

313—76, 77